United States Patent
Ogura et al.

[11] Patent Number: 5,396,081
[45] Date of Patent: Mar. 7, 1995

[54] RADIATION IMAGE READ-OUT APPARATUS

[75] Inventors: Nobuhiko Ogura; Sumihiro Nishihata, both of Kanagawa, Japan

[73] Assignee: Fuji Photo Film Co., Ltd., Kanagawa, Japan

[21] Appl. No.: 196,551

[22] Filed: Feb. 15, 1994

[30] Foreign Application Priority Data

Feb. 22, 1993 [JP] Japan .................. 5-031689

[51] Int. Cl.6 .................................................. G03B 42/02
[52] U.S. Cl. .................................... 250/585; 250/586
[58] Field of Search ............ 250/584, 585, 586, 589

[56] References Cited

U.S. PATENT DOCUMENTS

| | | | |
|---|---|---|---|
| 4,258,264 | 3/1981 | Kotera et al. | 250/585 |
| 4,276,473 | 6/1981 | Kato et al. | 250/587 |
| 4,315,318 | 2/1982 | Kato et al. | 382/6 |
| 4,387,428 | 6/1983 | Ishida et al. | 364/413.13 |
| 4,651,220 | 3/1987 | Hosoi et al. | 358/471 |
| 4,886,968 | 12/1989 | Ohnishi et al. | 250/586 |
| 4,889,990 | 12/1989 | Hosoi et al. | 250/583 |
| 4,945,238 | 7/1990 | Muraishi | 250/589 |
| 5,025,157 | 6/1991 | Katsuaki | 250/589 |
| 5,047,643 | 9/1991 | Ogura | 250/584 |

FOREIGN PATENT DOCUMENTS

| | | | |
|---|---|---|---|
| 56-11395 | 2/1981 | Japan | G21K 4/00 |
| 63-82410 | 4/1988 | Japan | G03B 42/02 |
| 64-6918 | 1/1989 | Japan | G02B 26/10 |
| 1-207736 | 8/1989 | Japan | 250/586 |
| 1-207737 | 8/1989 | Japan | 250/585 |

Primary Examiner—Constantine Hannaher
Assistant Examiner—Edward J. Glick
Attorney, Agent, or Firm—Sughrue, Mion, Zinn, Macpeak & Seas

[57] ABSTRACT

A radiation image read-out apparatus comprises a device for holding a stimulable phosphor sheet along a cylindrical surface, an optical element for transmitting one of stimulating rays and light emitted by the stimulable phosphor sheet and reflecting the other thereof, and a spinner, which is provided with a deflection mirror and a condensing lens. The deflection mirror reflects the stimulating rays coming from the optical element toward the stimulable phosphor sheet. The condensing lens is located in the optical path of the stimulating rays having been reflected by the deflection mirror and converges the stimulating rays on the stimulable phosphor sheet. The condensing lens also converges the emitted light at a predetermined converging position. The deflection mirror and the condensing lens are rotated together to scan the stimulating rays on the stimulable phosphor sheet in a main scanning direction. The stimulable phosphor sheet is moved in a sub-scanning direction. A light receiving face of a photodetector is located at a position, at which the light having a center wavelength in the wavelength distribution of the emitted light is converged by the condensing lens.

3 Claims, 6 Drawing Sheets

RADIATION IMAGE READ-OUT APPARATUS

BACKGROUND OF THE INVENTION

1. Field of the Invention

This invention relates to a radiation image read-out apparatus, wherein a stimulable phosphor sheet, on which a radiation image has been stored, is scanned with stimulating rays, which cause the stimulable phosphor sheet to emit light in proportion to the amount of energy stored thereon during its exposure to radiation, the emitted light is photoelectrically detected, and the radiation image is thereby read out. This invention particularly relates to a radiation image read-out apparatus, wherein a stimulable phosphor sheet is held along a cylindrical surface and scanned with stimulating rays radiated from a rotating member, which rotates around the center axis of the cylindrical surface.

2. Description of the Prior Art

When certain kinds of phosphors are exposed to radiation such as X-rays, $\alpha$-rays, $\beta$-rays, $\gamma$-rays, cathode rays or ultraviolet rays, they store part of the energy of the radiation. Then, when the phosphor which has been exposed to the radiation is exposed to stimulating rays, such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a radiation image of an object, such as a human body, is stored on a sheet provided with a layer of the stimulable phosphor (hereinafter referred to as a stimulable phosphor sheet). The stimulable phosphor sheet is then scanned with stimulating rays, such as a laser beam, which cause it to emit light in proportion to the amount of energy stored thereon during its exposure to the radiation. The light emitted by the stimulable phosphor sheet when it is exposed to the stimulating rays is photoelectrically detected and converted into an electric image signal. The image signal is then used during the reproduction of the radiation image of the object as a visible image on a recording material, such as photographic film, on a display device, such as a cathode ray tube (CRT) display device, or the like.

Stimulable phosphor sheets are used as a means for recording radiation images mainly in the field of medicine, but they may be used in various other fields as well. For example, in U.S. Pat. Nos. 4,651,220 and 4,889,990, the applicant proposed novel methods for recording and reproducing an electron microscope image wherein a stimulable phosphor sheet is utilized. Basically, the proposed methods for recording and reproducing an electron microscope image comprise the steps of (i) exposing a stimulable phosphor sheet, which is capable of storing electron beam energy thereon, to an electron beam which has passed through a sample in a vacuum in order to store the electron beam energy on the stimulable phosphor sheet, (ii) thereafter exposing the stimulable phosphor sheet to, for example, stimulating rays which cause it to release the stored energy as emitted light, (iii) photoelectrically detecting the emitted light, an image signal being thereby obtained, and (iv) using the image signal during the reproduction of an electron microscope image of the sample.

It is desirable that a read-out apparatus, which is used for the aforesaid electron microscope image recording and reproducing methods in order to irradiate the stimulating rays to the stimulable phosphor sheet and to detect the light emitted by the stimulable phosphor sheet, be capable of scanning the stimulating rays at a higher density than the density, at which the read-out apparatus for the aforesaid systems for recording and reproducing the radiation image of a human body, or the like, scans stimulating rays. Also, it is desirable that the former read-out apparatus be capable of detecting the recorded images at a higher accuracy than the accuracy, at which the latter read-out apparatus detects the recorded images. In order to satisfy the aforesaid requirements, novel radiation image read-out apparatuses have been proposed in U.S. Pat. Nos. 4,886,968 and 5,047,643.

With the proposed radiation image read-out apparatuses, a stimulable phosphor sheet is held and secured along a cylindrical surface and scanned with stimulating rays radiated from a rotating member, which rotates around the center axis of the cylindrical surface. Basically, the proposed radiation image read-out apparatuses comprise:

i) a sheet holding means for holding a stimulable phosphor sheet along a cylindrical surface,
ii) a stimulating ray source, which produces stimulating rays,
iii) an optical element, which is located in an optical path of the stimulating rays, and which transmits one of the stimulating rays and the light emitted by the stimulable phosphor sheet and reflects the other thereof,
iv) a spinner provided with:
 a) a deflection mirror, which reflects the stimulating rays coming from the optical element toward the stimulable phosphor sheet, the reflection being effected on the center axis of the cylindrical surface, and
 b) a condensing lens, which is located in the optical path of the stimulating rays having been reflected by the deflection mirror, and which converges the stimulating rays on the stimulable phosphor sheet,
the spinner rotating the deflection mirror and the condensing lens together with each other and coaxially with respect to the center axis, the stimulating rays being thereby caused to scan the stimulable phosphor sheet in a main scanning direction,
v) a sub-scanning means for moving the sheet holding means with respect to the spinner and in a direction parallel to the center axis,
vi) a detection lens located in an optical path of the light emitted by the stimulable phosphor sheet, which light has passed through the condensing lens and comes from the optical element, the detection lens converging the emitted light, and
vii) a photodetector for detecting the emitted light, which is converged by the detection lens.

With the proposed radiation image read-out apparatuses, the stimulating rays can be converged to a spot having a small diameter, and therefore the aforesaid requirements can be satisfied.

However, with the proposed radiation image read-out apparatuses, the condensing lens is mounted on the spinner, and the detection lens for converging the light emitted by the stimulable phosphor sheet is located independently of the condensing lens. Therefore, the structures around the spinner and the photodetector cannot be kept simple, and the cost of the radiation image read-out apparatus cannot be kept low.

Japanese Unexamined Patent Publication Nos. 63(1988)-82410 and 64(1989)-6918 disclose apparatuses, wherein collimated stimulating rays are caused to impinge upon a condensing lens and converged on a stimulable phosphor sheet by the condensing lens. The light, which is emitted by the stimulable phosphor sheet when the stimulable phosphor sheet is exposed to the stimulating rays, is collimated by the condensing lens, and the emitted light which has thus been collimated is detected by a photodetector. With the disclosed structures, the detection lens described above need not be provided independently of the condensing lens. Therefore, it may be considered to utilize the disclosed structure in a radiation image read-out apparatus using a spinner and thereby to simplify the radiation image read-out apparatus and keep the cost of the radiation image read-out apparatus low.

However, in such cases, the emitted light which has been collimated is detected by the photodetector. Therefore, it is necessary to use a large-sized photodetector having a larger light receiving face than that of a photodetector used to detect the emitted light which has been converged. As a result, the size of the radiation image read-out apparatus cannot be kept small. Also, in such cases, if the distance between the stimulable phosphor sheet and the condensing lens fluctuates, the problems will occur in that the light emitted by the stimulable phosphor sheet diffuses from the collimated state, and therefore part of the emitted light goes to a position outside of the light receiving face of the photodetector. As a result, the emitted light cannot be detected accurately.

SUMMARY OF THE INVENTION

The primary object of the present invention is to provide a cylindrical scanning type of radiation image read-out apparatus, wherein the size of a photodetector may be kept small, and light emitted by a stimulable phosphor sheet is detected accurately.

Another object of the present invention is to provide a cylindrical scanning type of radiation image read-out apparatus, which has a simpler structure than a conventional radiation image read-out apparatus and the cost of which is kept low.

The present invention is based on the findings that, ordinarily, the wavelength distribution for stimulation of a stimulable phosphor sheet and the wavelength distribution of light emitted by the stimulable phosphor sheet are different from each other. Basically, the present invention provides a cylindrical scanning type of radiation image read-out apparatus comprising a sheet holding means, a stimulating ray source, an optical element, a spinner for the main scanning with stimulating rays, the spinner being provided with a deflection mirror and a condensing lens, a sub-scanning means, and a photodetector, which are of the types described above, wherein chromatic aberration of the condensing lens, which converges the stimulating rays on a stimulable phosphor sheet, is utilized, and the light emitted by the stimulable phosphor sheet is converged by the condensing lens and then detected by the photodetector.

Specifically, the present invention provides a radiation image read-out apparatus, wherein a stimulable phosphor sheet, on which a radiation image has been stored, is scanned with stimulating rays, which cause the stimulable phosphor sheet to emit light in proportion to the amount of energy stored thereon during its exposure to radiation, the emitted light having a wavelength distribution different from the wavelength distribution of the stimulating rays, the emitted light is photoelectrically detected, and the radiation image is thereby read out, the radiation image read-out apparatus comprising:
i) a sheet holding means for holding the stimulable phosphor sheet along a cylindrical surface,
ii) a stimulating ray source, which produces the stimulating rays,
iii) an optical element, which is located in an optical path of the stimulating rays, and which transmits one of the stimulating rays and the light emitted by the stimulable phosphor sheet and reflects the other thereof,
iv) a spinner provided with:
a) a deflection mirror, which reflects the stimulating rays coming from the optical element toward the stimulable phosphor sheet, the reflection being effected on the center axis of the cylindrical surface, and
b) a condensing lens, which is located in the optical path of the stimulating rays having been reflected by the deflection mirror, and which converges the stimulating rays on the stimulable phosphor sheet, the condensing lens also converging the light, which is emitted by the stimulable phosphor sheet, at a predetermined converging position,
the spinner rotating the deflection mirror and the condensing lens together with each other and coaxially with respect to the center axis, the stimulating rays being thereby caused to scan the stimulable phosphor sheet in a main scanning direction,
v) a sub-scanning means for moving the sheet holding means with respect to the spinner and in a direction parallel to the center axis, and
vi) a photodetector located such that its light receiving face may be located at a position, at which the light having the center wavelength in the wavelength distribution of the light emitted by the stimulable phosphor sheet is converged by the condensing lens.

With the radiation image read-out apparatus in accordance with the present invention, the emitted light, which has been converged by the condensing lens, is detected by the photodetector. Therefore, a photodetector having a comparatively small light receiving face can be used in order to detect the emitted light. Also, even if the distance between the stimulable phosphor sheet and the condensing lens fluctuates, the problems will not occur in that part of the light emitted by the stimulable phosphor sheet goes to a position outside of the light receiving face of the photodetector. Accordingly, the emitted light can be detected accurately.

Further, with the radiation image read-out apparatus in accordance with the present invention, the condensing lens for converging the stimulating rays on the stimulable phosphor sheet also serves to converge the light, which is emitted by the stimulable phosphor sheet, on the light receiving face of the photodetector. Therefore, the structure of the radiation image read-out apparatus in accordance with the present invention can be kept simpler, and the cost thereof can be kept lower than a conventional radiation image read-out apparatus, which is provided with the aforesaid detection lens, or the like, in addition to the condensing lens.

As will be understood from the specification, it should be noted that the term "moving a sheet holding means with respect to a spinner" as used herein means movement of the sheet holding means relative to the spinner, and embraces both the cases wherein the sheet holding means is moved while the spinner is kept stationary, and cases wherein the spinner is moved while the sheet holding means is kept stationary.

DESCRIPTION OF THE PREFERRED EMBODIMENTS

The present invention will hereinbelow be described in further detail with reference to the accompanying drawings.

Figure 2:
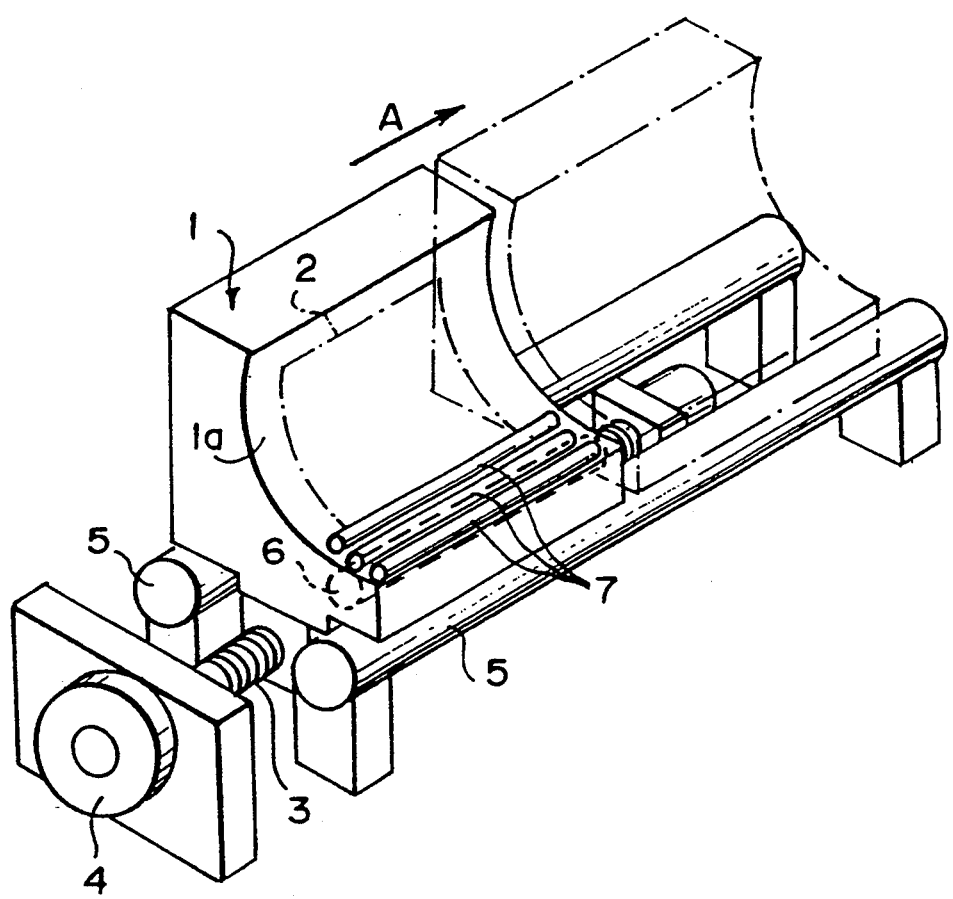
FIG. 2 is a perspective view showing a sheet holding means and a sub-scanning means in the embodiment of FIG. 1.

FIG. 2 shows a sheet holding means and a subscanning means in an embodiment of the radiation image read-out apparatus in accordance with the present invention. With reference to FIG. 2, a platen 1 as a sheet holding means has a concave cylindrical surface 1a, and a drive roller 6 and rollers 7, 7, 7 are provided close to the lower edge portion of the cylindrical surface 1a. A stimulable phosphor sheet 2 carries a radiation image stored thereon by, for example, being exposed to radiation, which has passed through an object, such as a human body, or to an electron beam which has passed through a sample in an electron microscope. The stimulable phosphor sheet 2 is conveyed by a known sheet conveyance means (not shown), and the leading edge of the sheet 2 is fed to the lower part of the platen 1. Then, the drive roller 6 is rotated to feed the sheet 2 to a predetermined position along the cylindrical surface 1a.

In this manner, the stimulable phosphor sheet 2 is held as indicated by the chained line in FIG. 2 on the platen 1. The lower part of the platen 1 is engaged with a screw rod 3. The screw rod 3 is rotated by a motor 4 in order to move the platen 1 at a predetermined speed and in the direction indicated by the arrow A along two guide rails 5, 5. The platen 1 is thus moved between the position indicated by the solid lines in FIG. 2 and the position indicated by the chained line. In this embodiment, the sub-scanning means is constituted of the screw rod 3, the motor 4, and the guide rails 5, 5.

Figure 1:
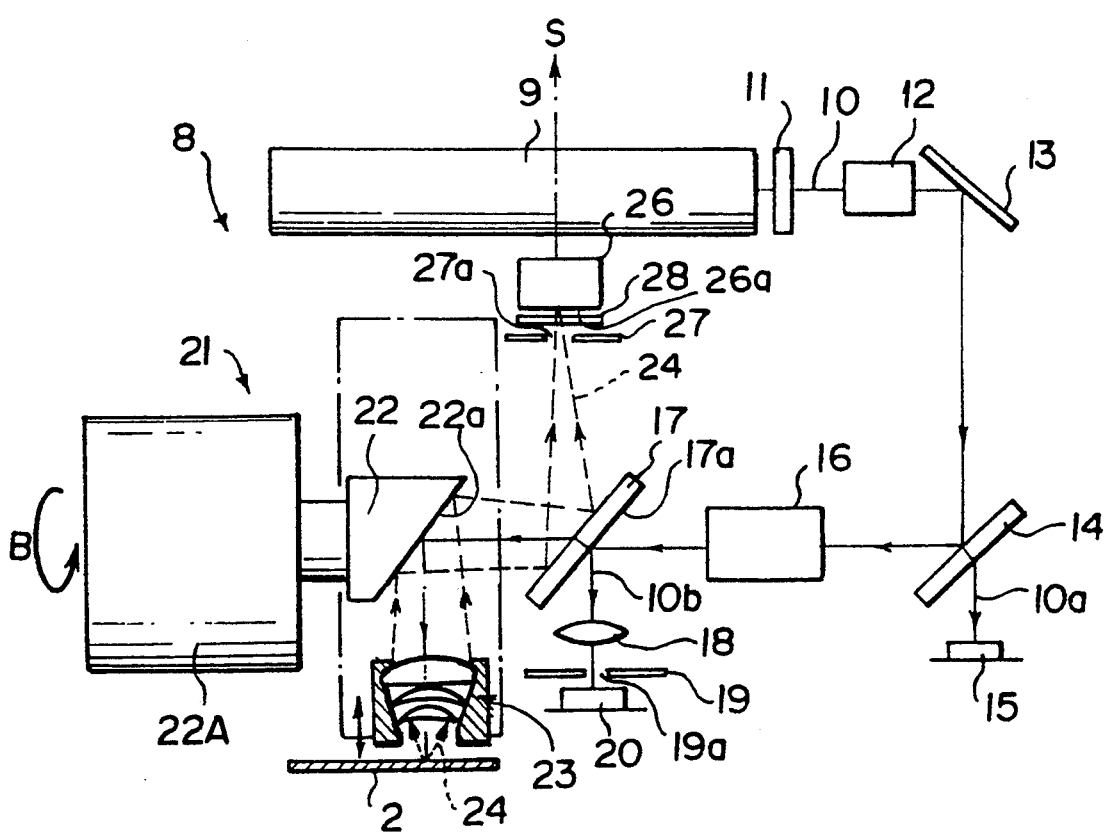
FIG. 1 is a front view showing a scanning optical system in an embodiment of the radiation image read-out apparatus in accordance with the present invention.
Figure 3:
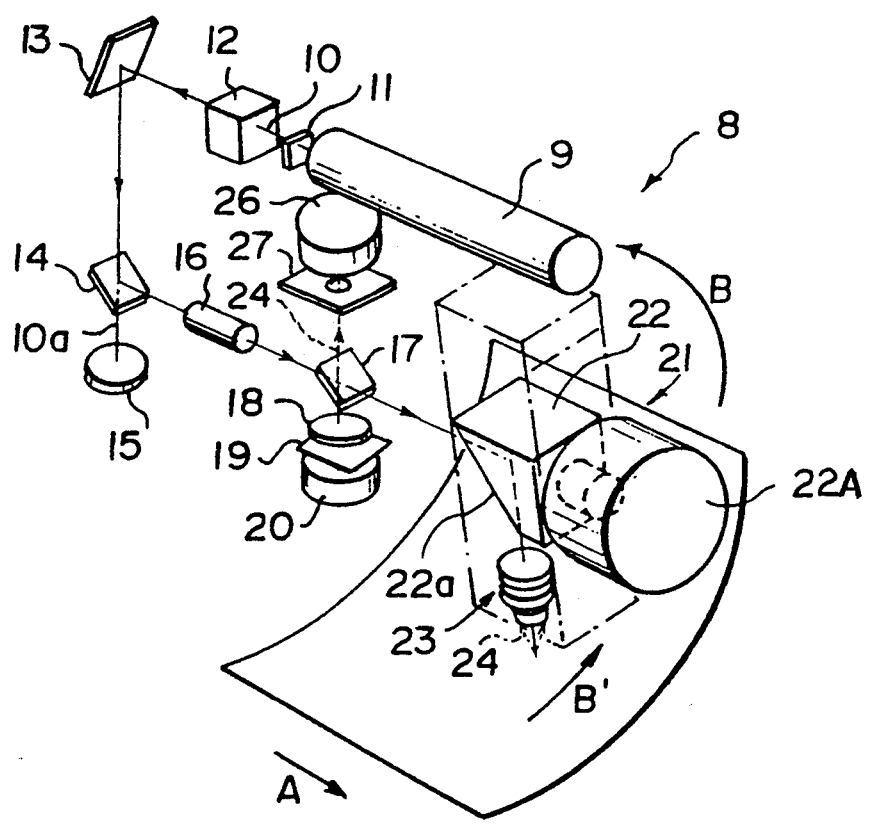
FIG. 3 is a perspective view showing the scanning optical system in the embodiment of FIG. 1.

A scanning optical system 8 having the structure shown in FIGS. 1 and 3 is located above the platen 1. The image stored on the stimulable phosphor sheet 2 is read out by the scanning optical system 8. In the scanning optical system 8, a laser beam 10 serving as stimulating rays is produced by a He-Ne laser 9, which is a source for the stimulating rays. The laser beam 10 is passed through a filter 11 for filtering out light of unnecessary wavelengths and is then passed through an acousto-optic modulator (AOM) 12 for adjusting the intensity of the laser beam 10. Thereafter, the laser beam 10 is reflected by mirrors 13 and 14, and the direction of the optical path of the laser beam 10 is thereby changed. The mirror 14 transmits a predetermined small portion of the incident laser beam 10 as indicated by 10a. The intensity of the laser beam 10a, which has passed through the mirror 14, is detected by a photodetector 15. The photodetector 15 controls the AOM 12 in accordance with the detected intensity of the laser beam 10a so that the intensity of the laser beam 10 radiated by the AOM 12 may be kept constant.

The portion of the laser beam 10, which has been reflected by the mirror 14, is passed through a beam expander 16, which expands the beam diameter of the laser beam 10 to a predetermined value. Thereafter, the laser beam 10 impinges upon a dichroic mirror 117. The dichroic mirror 17 transmits light having wavelengths within the range of wavelengths of the laser beam 10 and reflects light having wavelengths within the range of wavelengths of the light, which is emitted by the stimulable phosphor sheet 2 when the stimulable phosphor sheet 2 is exposed to the laser beam 10. The dichroic mirror 17 has a laser beam input face 17a, which has been subjected to surface treatment such that it may reflect a very small portion of the incident laser beam 10 as indicated by 10b. The laser beam 10b, which has been reflected by the laser beam input face 17a, is converged by a converging lens 18, passes through an aperture 19a of an aperture plate 19, and is then detected by a photodetector 20. The photodetector 20 detects the position of incidence of the laser beam 10b and determines whether the optical axis of the laser beam 10 has a predetermined direction. The photodetector 20 generates a signal for fine adjustment of the positions of the mirrors 13 and 14.

The laser beam 10, which has passed through the dichroic mirror 17, impinges upon a spinner 21, which is located in the optical path of the laser beam 10. The laser beam 10 is thus reflected and deflected by the spinner 21. The spinner 21 is provided with a spindle motor 22A, which continuously and quickly rotates a deflection mirror 22 in the direction indicated by the arrow B. The deflection mirror 22 has a reflection surface 22a, which is inclined at an angle of 45° with respect to the incident laser beam 10. The deflection mirror 22 is located such that it may reflect the laser beam 10 on the center axis of the cylindrical surface 1a of the platen 1. The length of the optical path of the laser beam 10 between the position, at which the laser beam 10 is reflected by the deflection mirror 22, and the position, at which the laser beam 10 impinges upon the stimulable phosphor sheet 2, is kept constant.

A condensing lens 23 for converging the laser beam 10 incident as a collimated light beam to a spot having a desirable diameter on the stimulable phosphor sheet 2 is located in the optical path of the laser beam 10, which has been reflected and deflected by the deflection mirror 22. The condensing lens 23 constitutes part of the spinner 21 and is rotated together with the deflection mirror 22. The laser beam 10 is reflected and deflected by the spinner 21 and is thereby caused to scan the stimulable phosphor sheet 2 repeatedly in the main scanning direction, which is indicated by the arrow B' in FIG. 3. At the same time, as described above, the platen 1 is moved at a predetermined speed in the sub-scanning direction indicated by the arrow A. Therefore, the stimulable phosphor sheet 2 is two-dimensionally scanned with the laser beam 10.

The condensing lens 23 can be located close to the stimulable phosphor sheet 2 without its diameter being increased. Therefore, a lens having a short focal length can be used as the condensing lens 23 such that the laser beam 10 can be converged to a very small spot diameter, and the operation for reading out the radiation image from the stimulable phosphor sheet 2 can be carried out at a high resolution.

In this embodiment, the wavelength of the laser beam 10 is 632.8 nm. When the stimulable phosphor sheet 2 is exposed to the laser beam 10, the exposed portion of the stimulable phosphor sheet 2 emits light 24 in an amount proportional to the amount of energy stored on said portion during its exposure to radiation. The wavelength of the light 24 emitted by the stimulable phosphor sheet 2 is primarily 405 nm. The light 24 is emitted as non-directional light by the exposed portion of the stimulable phosphor sheet 2. The emitted light 24 is converged by the condensing lens 23, which is spaced a predetermined distance from the exposed portion of the stimulable phosphor sheet 2. The emitted light 24, which is thus being converged, is reflected by the deflection mirror 22 of the spinner 21 and then by the dichroic mirror 17. A photodetector (a photomultiplier) 26 is located in the optical path of the emitted light 24, which has been reflected by the dichroic mirror 17, such that a light receiving face 26a of the photomultiplier 26 may be located at the position of convergence of the emitted light 24.

An aperture plate 27 is located in front of the photomultiplier 26. The aperture plate 27 has an aperture 27a of a size that allows only the emitted light 24 carrying the image information to pass therethrough. Specifically, part of the laser beam 10 impinging upon the stimulable phosphor sheet 2 may be reflected by the sheet surface, and the reflected laser beam may impinge upon members in the apparatus, such as the condensing lens 23. The laser beam may then be reflected by these members back to the stimulable phosphor sheet 2 but not to the predetermined position of laser beam irradiation. In such cases, light is undesirably emitted by portions of the sheet stimulated when the laser beam is reflected back to the sheet. However, the light thus emitted by the sheet portions passes through the condensing lens 23, the dichroic mirror 17, and the like, and is guided to positions different from the position, to which the light 24 emitted by the predetermined position on the stimulable phosphor sheet 2 is guided. Therefore, the light thus emitted by the sheet portions is intercepted by the aperture plate 27, and is prevented from impinging upon the photomultiplier 26.

In this manner, with the embodiment wherein the aperture plate 27 is provided, the light, which is emitted by the stimulable phosphor sheet 2 when it is exposed to reflected stimulating rays and stimulating rays scattered in the stimulable phosphor sheet 2, can be cut off, and the image read-out operation can be carried out accurately. However, the aperture plate 27 need not necessarily be provided.

The laser beam 10, which has been reflected by the stimulable phosphor sheet 2 and has passed through the condensing lens 23, will often pass through the aperture 27a of the aperture plate 27 together with the light 24 emitted by the stimulable phosphor sheet 2. In order to eliminate this problem, a filter 28 for selectively transmitting only light having a wavelength within the wavelength range of the emitted light 24 is provided on the light receiving face of the photomultiplier 26. The filter 28 filters out the laser beam 10, which has passed through the aperture 27a. The photomultiplier 26 photoelectrically detects the emitted light 24 and generates a read-out image signal S. The read-out image signal S is processed in an image processing circuit (not shown). The processed image signal is fed into an image reproducing apparatus (not shown) constituted of, for example, a CRT display device or a light beam scanning recording apparatus, and is used during the reproduction of the radiation image as a visible image on the CRT display device or as a hard copy.

By the time the image read-out operation is finished, the platen 1 has moved to the position indicated by the chained line in FIG. 2, and stops at this position. Thereafter, the direction of rotation of the roller 6 is reversed, and the stimulable phosphor sheet 2 is moved from the platen 1 to a sheet conveyance system (not shown).

Figure 4:
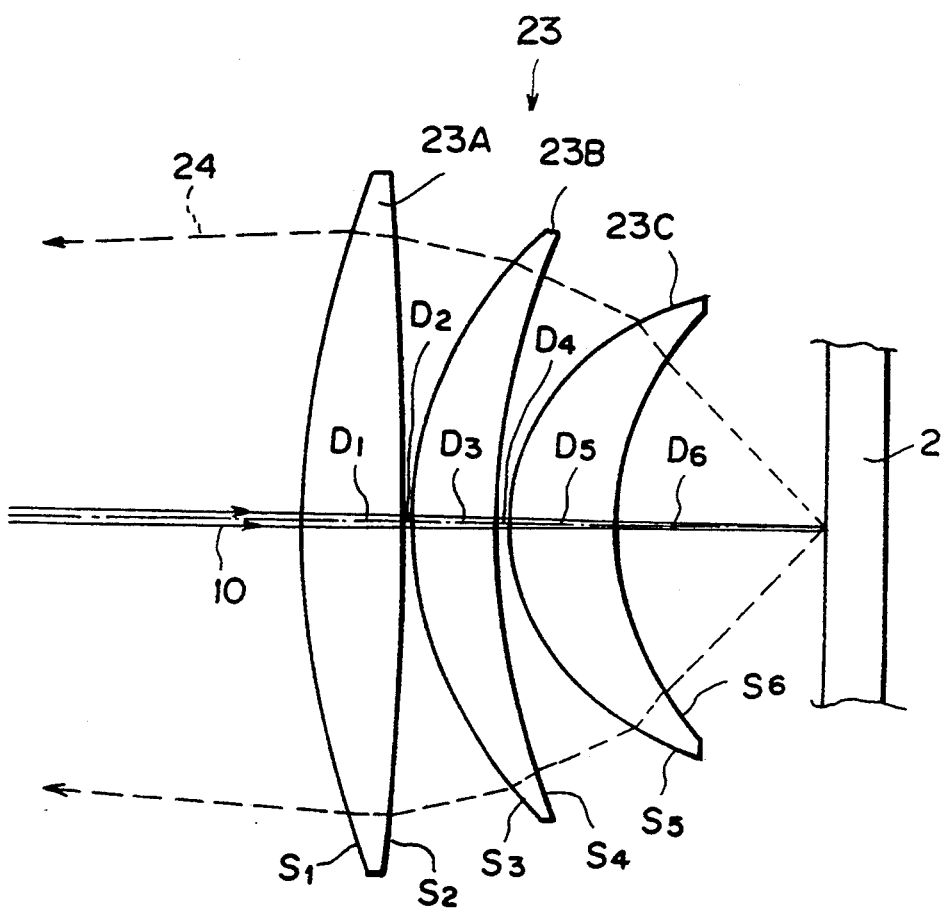
FIG. 4 is a sectional view showing an example of a condensing lens employed in the embodiment of FIG. 1.

The configuration of the condensing lens 23 will hereinbelow be described in detail with reference to FIG. 4. As illustrated in FIG. 4, the condensing lens 23 is composed of three sets of spherical lenses 23A, 23B, and 23C (each set being composed of a single spherical lens). The spherical lens 23C, which is located on the side of the stimulable phosphor sheet 2, is constituted of a convex meniscus lens, the concave surface of which stands facing the stimulable phosphor sheet 2. The vitreous materials of the spherical lenses 23A, 23B, and 23C are F2 supplied by Hoya Corp. The medium, which is present around the spherical lenses 23A, 23B, and 23C, is air. The table below shows radii of curvature R1, R2, R3, R4, R5, and R6 of the surfaces S1, S2, S3, S4, S5, and S6 of the spherical lenses 23A, 23B, and 23C. The table below also shows distances D1, D2, D3, D4, D5, and D6 between adjacent surfaces of the spherical lenses 23A, 23B, and 23C. The table below further shows refractive indices $n\lambda=405$ and $n\lambda=632.8$ of media with respect to the light 24 emitted by the stimulable phosphor sheet 2 (center wavelength: 405 nm) and the laser beam 10 (wavelength: 632.8 nm). (In this table and those that follow, the unit of the length is mm). In this table, refractive indices for the media associated with the distances Dk (k=1, 2, ..., 6) between adjacent surfaces of the spherical lenses 23A, 23B, and 23C are listed on the same rows as the corresponding distances Dk.

| k | Rk | Dk | $n_\lambda=405$ | $n_\lambda=632.8$ |
|---|---|---|---|---|
| 1 | 47.32514 | 5.238951 | 1.650593 | 1.616548 |
| 2 | −194.56288 | 0.500000 | 1.000000 | 1.000000 |
| 3 | 21.01565 | 4.467477 | 1.650593 | 1.616548 |
| 4 | 42.37917 | 0.500000 | 1.000000 | 1.000000 |
| 5 | 12.20423 | 5.299427 | 1.650593 | 1.616548 |
| 6 | 16.14496 | 11.237879 | 1.000000 | 1.000000 |

If the Abbe's dispersion numbers of the vitreous materials of the spherical lenses 23A, 23B, and 23C are respectively represented by $\nu d1$, $\nu d2$, and $\nu d3$, they will be expressed as $\nu d1=\nu d2=\nu d3=36.3$. Also, if the refractive indices of the vitreous materials of the spherical lenses 23A, 23B, and 23C with respect to the helium d-line are respectively represented by n1, n2, and n3, they will be expressed as n1=n2=n3=1.62004. The focal length f of the entire condensing lens system with respect to the laser beam 10 having a wavelength of 632.8 nm, the focal length fG1 of the spherical lens 23A, the focal length fG2 of the spherical lens 23B, and the focal length fG3 of the spherical lens 23C take values shown below. Therefore, the focal lengths f1, f2, and f3 of the spherical lenses 23A, 23B, and 23C, which focal lengths have been normalized by taking the focal length f of the entire condensing lens system as 1, take the values indicated in the parentheses.

$$f = 19.59956$$

$$f_{G1} = 62.25482 \ (f_1 = 3.1763)$$

$$f_{G2} = 62.62237 \ (f_2 = 3.1951)$$

$$f_{G3} = 53.60357 \ (f_3 = 2.7349)$$

The laser beam 10 impinges in the collimated form upon the condensing lens 23 and is converged on the stimulable phosphor sheet 2. The light 24, which is emitted by the portion of the stimulable phosphor sheet 2 exposed to the converged spot of the laser beam 10, passes through the condensing lens 23. At this time, the emitted light 24 is not collimated by the condensing lens 23 due to chromatic aberration of the condensing lens 23, but is converged on the light receiving face 26a of the photomultiplier 26 as described above. Therefore, in this embodiment, the light receiving face 26a of the photomultiplier 26 can be kept comparatively small. Also, even if the distance between the stimulable phosphor sheet 2 and the condensing lens 23 fluctuates, the problems will not occur in that part of the emitted light 24 goes to a position outside of the light receiving face 26a of the photomultiplier 26. Accordingly, the emitted light 24 can be detected accurately.

Further, in this embodiment, the condensing lens 23 for converging the laser beam 10 on the stimulable phosphor sheet 2 also serves to converge the emitted light 24 on the light receiving face 26a of the photomultiplier 26. Therefore, the structure of this embodiment of the radiation image read-out apparatus in accordance with the present invention can be kept simpler, and the cost thereof can be kept lower than a conventional radiation image read-out apparatus provided with a different lens, which condenses the emitted light, in addition to the condensing lens 23.

The configuration of the condensing lens 23 is not limited to that described above. Also, the wavelengths of the stimulating rays and the light emitted by the stimulable phosphor sheet are not limited to those described above. The condensing lens 23 may be designed so as to be suitable to the wavelengths of the stimulating rays and the light emitted by the stimulable phosphor sheet.

The inventors carried out experiments, wherein the stimulating rays are a collimated beam having a wavelength of 632.8 nm, the center wavelength of the emitted light 24 is 405 nm, all of the three sets of spherical lenses (each set being composed of a single spherical lens) constituting the condensing lens 23 are constituted of convex lenses, and one of the three spherical lenses, which is located on the side of the stimulable phosphor sheet 2, is constituted of a convex meniscus lens, the concave surface of which stands facing the stimulable phosphor sheet 2. The experiments revealed that appropriate chromatic aberration can be obtained if the relationship $$\Sigma(1/\nu di \cdot fi) > 0.016$$

is satisfied, wherein $\nu di$ represents the Abbe's dispersion number of the vitreous material constituting each spherical lens, and fi (i=1, 2, 3) represents the focal length of each spherical lens, which focal length has been normalized by taking the focal length of the entire condensing lens system as 1.

As for the condensing lens 23 employed in the embodiment described above, $\nu d1 = \nu d2 = \nu d3 = 36.3$, f1=3.1763, f2=3.1951, and f3=2.7349. Therefore, the formula $$\Sigma(1/\nu di \cdot fi) = 0.02737$$

obtains. Accordingly, this embodiment satisfies the aforesaid condition.

It was also revealed that, in cases where each of the three sets of spherical lenses (each set being composed of a single spherical lens) constituting the condensing lens 23 is constituted of a vitreous material having a refractive index n with respect to the helium d-line and an Abbe's dispersion number $\nu d$, which fall within the ranges $$1.5 < n < 1.65, \ 30 < \nu d < 65$$

the cost of the condensing lens 23 can be kept comparatively low. As for the condensing lens 23 employed in the embodiment described above, n1=n2=n3=1.62004, and $\nu d1 = \nu d2 = \nu d3 = 36.3$. Therefore, this embodiment satisfies the two conditions described above.

Figure 5:
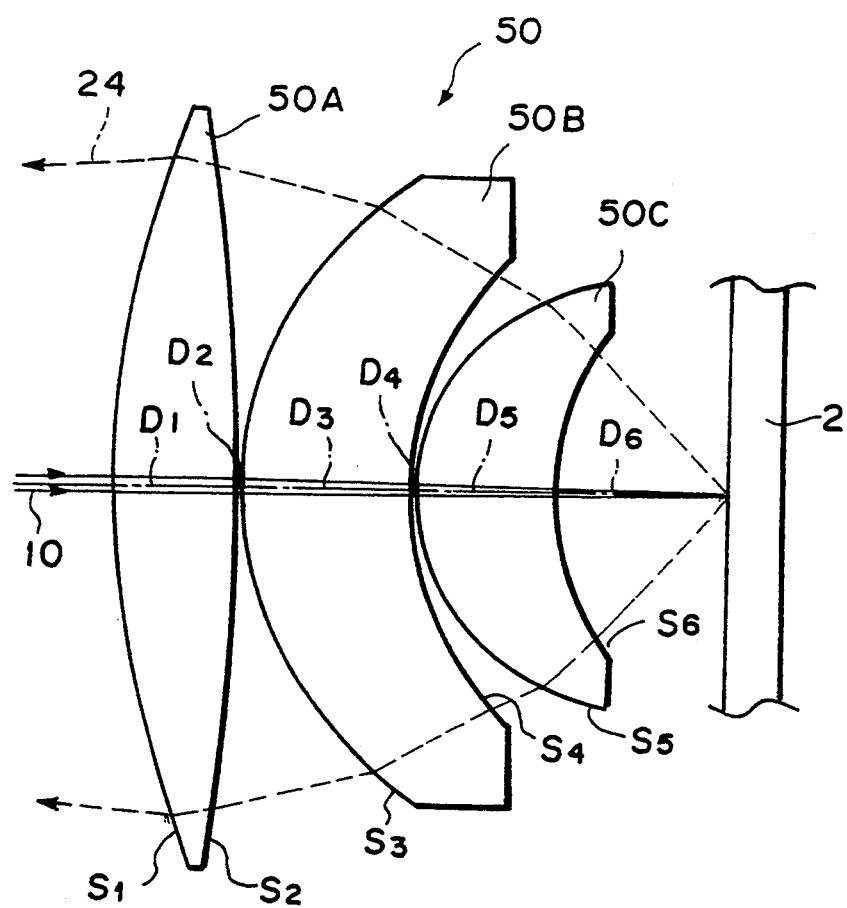
FIG. 5 is a sectional view showing a different example of a condensing lens employed in the radiation image read-out apparatus in accordance with the present invention.

A different example of the condensing lens, which satisfies the conditions described above, will be described hereinbelow with reference to FIG. 5. With reference to FIG. 5, as in the case of the aforesaid condensing lens 23, a condensing lens 50 is composed of three sets of spherical lenses 50A, 50B, and 50C (each set being composed of a single spherical lens). The spherical lens 50C, which is located on the side of the stimulable phosphor sheet 2, is constituted of a convex meniscus lens, the concave surface of which stands facing the stimulable phosphor sheet 2. The vitreous material of the spherical lens 50A is F1 supplied by Hoya Corp. The vitreous materials of the spherical lenses 50B and 50C are F2 supplied by Hoya Corp. The medium, which is present around the spherical lenses 50A, 50B, and 50C, is air. The table below shows radii of curvature R1, R2, R3, R4, R5, and R6 of the surfaces S1, S2, S3, S4, S5, and S6 of the spherical lenses 50A, 50B, and 50C. The table below also shows distances D1, D2, D3, D4, D5, and D6 between adjacent surfaces of the spherical lenses 50A, 50B, and 50C. The table below further shows refractive indices $n\lambda = 405$ and $n\lambda = 632.8$ of media with respect to the light 24 emitted by the stimulable phosphor sheet 2 (center wavelength: 405 nm) and the laser beam 10 (wavelength: 632.8 nm).

| k | Rk | Dk | $n_\lambda = 405$ | $n_\lambda = 632.8$ |
|---|---|---|---|---|
| 1 | 43.47307 | 5.662042 | 1.657190 | 1.622304 |
| 2 | −96.67636 | 0.200000 | 1.000000 | 1.000000 |
| 3 | 16.14224 | 7.927455 | 1.650593 | 1.616548 |
| 4 | 14.99967 | 0.200000 | 1.000000 | 1.000000 |
| 5 | 9.52241 | 6.010503 | 1.650593 | 1.616548 |

-continued

| k | Rk | Dk | $n_{\lambda=405}$ | $n_{\lambda=632.8}$ |
|---|---|---|---|---|
| 6 | 11.76258 | 7.704440 | 1.000000 | 1.000000 |

If the Abbe's dispersion numbers of the vitreous materials of the spherical lenses 50A, 50B, and 50C are respectively represented by $\nu d1$, $\nu d2$, and $\nu d3$, they will be expressed as $\nu d1=35.7$, and $\nu d2=d3=36.3$. Also, if the refractive indices of the vitreous materials of the spherical lenses 50A, 50B, and 50C with respect to the helium d-line are respectively represented by n1, n2, and n3, they will be expressed as $n1=1.62588$, and $n2=n3=1.62004$. The focal length f of the entire condensing lens system with respect to the laser beam 10 having a wavelength of 632.8 nm, the focal length fG1 of the spherical lens 50A, the focal length fG2 of the spherical lens 50B, and the focal length fG3 of the spherical lens 50C take values shown below. Therefore, the focal lengths f1, f2, and f3 of the spherical lenses 50A, 50B, and 50C, which focal lengths have been normalized by taking the focal length f of the entire condensing lens system as 1, take the values indicated in the parentheses.

$f = 19.50010$ $f_{G1} = 48.94744$ ($f_1 = 2.5101$)

$f_{G2} = 208.78671$ ($f_2 = 10.7070$)

$f_{G3} = 40.08108$ ($f_3 = 2.0554$)

In cases where the condensing lens 50 having the configuration described above is used, the light 24, which is emitted by the portion of the stimulable phosphor sheet 2 exposed to the converged spot of the laser beam 10, is converged on the light receiving face 26a of the photomultiplier 26 as shown in FIG. 1. Therefore, in this embodiment, the light receiving face 26a of the photomultiplier 26 can be kept comparatively small. Also, even if the distance between the stimulable phosphor sheet 2 and the condensing lens 50 fluctuates, the problems will not occur in that part of the emitted light 24 goes to a position outside of the light receiving face 26a of the photomultiplier 26. Accordingly, the emitted light 24 can be detected accurately.

Figure 6:
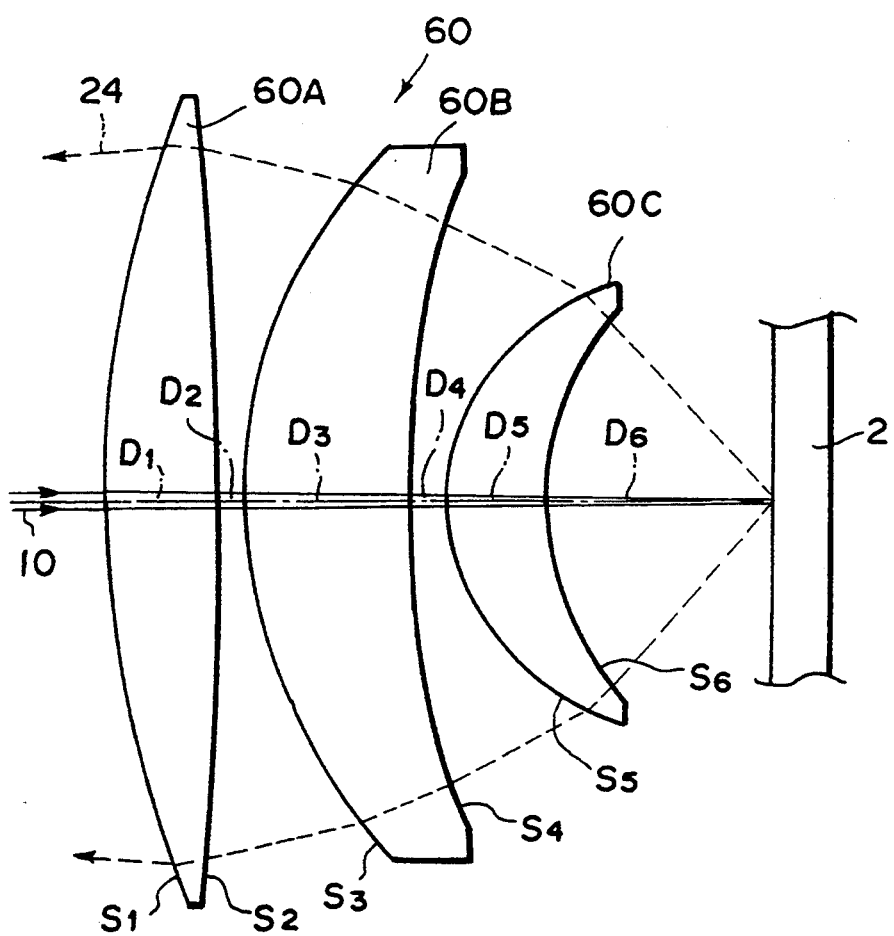
FIG. 6 is a sectional view showing a further different example of a condensing lens employed in the radiation image read-out apparatus in accordance with the present invention.

As for the condensing lens 50 employed in this embodiment of FIG. 5, $\nu d1=35.7$, $\nu d2=\nu d3=36.3$, $f1=2.5101$, $f2=10.7070$, and $f3=2.0554$. Therefore, the formula $\Sigma(1/\nu di \cdot fi) = 0.02714$ obtains. Accordingly, this embodiment satisfies the condition $\Sigma(1/\nu di \cdot fi) > 0.016$ Also, $n1=1.62588$, $n2=n3=1.62004$, $\nu d1=35.7$, and $\nu d2=\nu d3=36.3$. Therefore, this embodiment satisfies the two conditions $1.5 < n < 1.65, 30 < \nu d < 65$ A further different example of the condensing lens will be described hereinbelow with reference to FIG. 6. With reference to FIG. 6, as in the case of the aforesaid condensing lens 23, a condensing lens 60 is composed of three sets of spherical lenses 60A, 60B, and 60C (each set being composed of a single spherical lens). The spherical lens 60C, which is located on the side of the stimulable phosphor sheet 2, is constituted of a convex meniscus lens, the concave surface of which stands facing the stimulable phosphor sheet 2. The vitreous material of the spherical lens 60A is PCD2 supplied by Hoya Corp. The vitreous material of the spherical lens 60B is BACD3 supplied by Hoya Corp. The vitreous material of the spherical lens 60C is BACD4 supplied by Hoya Corp. The medium, which is present around the spherical lenses 60A, 60B, and 60C, is air. The table below shows radii of curvature R1, R2, R3, R4, R5, and R6 of the surfaces S1, S2, S3, S4, S5, and S6 of the spherical lenses 60A, 60B, and 60C. The table below also shows distances D1, D2, D3, D4, D5, and D6 between adjacent surfaces of the spherical lenses 60A, 60B, and 60C. The table below further shows refractive indices $n\lambda=405$ and $n\lambda=632.8$ of media with respect to the light 24 emitted by the stimulable phosphor sheet 2 (center wavelength: 405 nm) and the laser beam 10 (wavelength: 632.8 nm).

| k | Rk | Dk | $n_{\lambda=405}$ | $n_{\lambda=632.8}$ |
|---|---|---|---|---|
| 1 | 46.80263 | 5.022490 | 1.583750 | 1.566816 |
| 2 | −185.92755 | 1.340145 | 1.000000 | 1.000000 |
| 3 | 22.29667 | 7.606242 | 1.626274 | 1.606636 |
| 4 | 43.69661 | 1.742879 | 1.000000 | 1.000000 |
| 5 | 10.17783 | 4.288244 | 1.630373 | 1.610518 |
| 6 | 12.85585 | 10.492972 | 1.000000 | 1.000000 |

If the Abbe's dispersion numbers of the vitreous materials of the spherical lenses 60A, 60B, and 60C are respectively represented by $\nu d1$, $\nu d2$, and $\nu d3$, they will be expressed as $\nu d1=63.1$, $\nu d2=58.9$, and $\nu d3=58.6$. Also, if the refractive indices of the vitreous materials of the spherical lenses 60A, 60B, and 60C with respect to the helium d-line are respectively represented by n1, n2, and n3, they will be expressed as $n1=1.56873$, $n2=1.60881$, and $n3=1.61272$. The focal length f of the entire condensing lens system with respect to the laser beam 10 having a wavelength of 632.8 nm, the focal length fG1 of the spherical lens 60A, the focal length fG2 of the spherical lens 60B, and the focal length fG3 of the spherical lens 60C take values shown below. Therefore, the focal lengths f1, f2, and f3 of the spherical lenses 60A, 60B, and 60C, which focal lengths have been normalized by taking the focal length f of the entire condensing lens system as 1, take the values indicated in the parentheses.

$f = 20.81172$ $f_{G1} = 66.48495$ ($f_1 = 3.1946$)

$f_{G2} = 66.16911$ ($f_2 = 3.1794$)

$f_{G3} = 49.79942$ ($f_3 = 2.3929$)

In cases where the condensing lens 60 having the configuration described above is used, the light 24, which is emitted by the portion of the stimulable phosphor sheet 2 exposed to the converged spot of the laser beam 10, is converged on the light receiving face 26a of the photomultiplier 26 as shown in FIG. 1. Therefore, in this embodiment, the light receiving face 26a of the photomultiplier 26 can be kept comparatively small. Also, even if the distance between the stimulable phosphor sheet 2 and the condensing lens 60 fluctuates, the problems will not occur in that part of the emitted light 24 goes to a position outside of the light receiving face 26a of the photomultiplier 26. Accordingly, the emitted light 24 can be detected accurately.

As for the condensing lens 60 employed in this embodiment of FIG. 5, $\nu d1 = 63.1$, $\nu d2 = 58.9$, $\nu d3 = 58.6$, $f1 = 3.1946$, $f2 = 3.1794$, and $f3 = 2.3929$. Therefore, the formula $$\Sigma(1/\nu di \cdot fi) = 0.01743$$

obtains. Accordingly, this embodiment satisfies the condition $$\Sigma(1/\nu di \cdot fi) > 0.016$$

Also, $n1 = 1.56873$, $n2 = 1.60881$, $n3 = 1.61272$, $\nu d1 = 63.1$, $\nu d2 = 58.9$, and $\nu d3 = 58.6$. Therefore, this embodiment satisfies the two conditions $$1.5 < n < 1.65, \quad 30 < \nu d < 65$$

In the aforesaid embodiments, the dichroic mirror 17 is used as the optical element for guiding the laser beam 10, which serves as stimulating rays, toward the stimulable phosphor sheet 2 and guiding the light 24 emitted by the stimulable phosphor sheet 2 toward the photomultiplier 26, which serves as the photodetector. However, in cases where the intensity of the stimulating rays and the intensity of the emitted light 24 are comparatively high, an ordinary semi-transparent mirror may be utilized instead of the dichroic mirror 17. Also, in order to carry out the sub-scanning, instead of the sheet holding means being moved, the overall scanning optical system 8 may be moved. Moreover, the configuration and layout of each optical element of the scanning optical system 8 are not limited to those employed in the aforesaid embodiments.

What is claimed is:

1. A radiation image read-out apparatus, wherein a stimulable phosphor sheet, on which a radiation image has been stored, is scanned with stimulating rays, which cause the stimulable phosphor sheet to emit light in proportion to the amount of energy stored thereon during its exposure to radiation, the emitted light having a wavelength distribution different from the wavelength distribution of the stimulating rays, the emitted light is photoelectrically detected, and the radiation image is thereby read out, the radiation image read-out apparatus comprising:
(i) a sheet holding means for holding the stimulable phosphor sheet along a cylindrical surface,
(ii) a stimulating ray source, which produces the stimulating rays,
(iii) an optical element, which is located in an optical path of the stimulating rays, and which transmits one of the stimulating rays and the light emitted by the stimulable phosphor sheet and reflects the other thereof,
(iv) a spinner provided with:
   a) a deflection mirror, which reflects the stimulating rays coming from said optical element toward the stimulable phosphor sheet, the reflection being effected on the center axis of said cylindrical surface, and
   b) a condensing lens, which is located in the optical path of the stimulating rays having been reflected by said deflection mirror, and which converges the stimulating rays on the stimulable phosphor sheet, said condensing lens also converging the light, which is emitted by the stimulable phosphor sheet, at a predetermined converging position,
said spinner rotating said deflection mirror and said condensing lens together with each other and coaxially with respect to said center axis, the stimulating rays being thereby caused to scan the stimulable phosphor sheet in a main scanning direction,
v) a sub-scanning means for moving said sheet holding means with respect to said spinner and in a direction parallel to said center axis, and
vi) a photodetector located such that its light receiving face is located substantially at said predetermined converging position, at which the light having a center wavelength in the wavelength distribution of the light emitted by the stimulable phosphor sheet is converged by said condensing lens.

2. An apparatus as defined in claim 1 wherein the stimulating rays, which impinge upon said condensing lens of said spinner, are a collimated beam, which has a wavelength of 632.8 nm and has been produced by a He-Ne laser, the center wavelength of the light emitted by the stimulable phosphor sheet is 405 nm,
said condensing lens of said spinner is composed of a lens system including three convex lenses, one of said convex lenses, which is located on the side of the stimulable phosphor sheet, being constituted of a convex meniscus lens, a concave surface of which stands facing the stimulable phosphor sheet, and
the relationship $$\Sigma(1/\nu di \cdot fi) > 0.016$$

satisfied, where $\nu di$ represents the Abbe's dispersion number of a vitreous material constituting each convex lens, and fi (i=1, 2, 3) represents the focal length of each convex lens, which focal length has been normalized by taking the focal length of the condensing lens system as 1.

3. An apparatus as defined in claim 2 wherein each of said convex lenses constituting said condensing lens of said spinner is constituted of a vitreous material having a refractive index n with respect to the helium d-line and an Abbe's dispersion number $\nu d$, which fall within the ranges $$1.5 < n < 1.65, \quad 30 < \nu d < 65.$$

* * * * *